(12) United States Patent
Samudra et al.

(10) Patent No.: US 9,686,380 B1
(45) Date of Patent: Jun. 20, 2017

(54) METHOD AND APPARATUS FOR BYPASSING INTERNET TRAFFIC

(75) Inventors: Pradeep Samudra, Plano, TX (US); Kerby A. Lyons, Southlake, TX (US); Adrien J. Joseph, Lisle, IL (US)

(73) Assignee: Tellabs Operations, Inc., Naperville, IL (US)

( * ) Notice: Subject to any disclaimer, the term of this patent is extended or adjusted under 35 U.S.C. 154(b) by 952 days.

(21) Appl. No.: 12/390,165

(22) Filed: Feb. 20, 2009

(51) Int. Cl.
*G06F 15/16* (2006.01)
*H04L 29/06* (2006.01)
*H04W 80/04* (2009.01)

(52) U.S. Cl.
CPC ........... *H04L 69/161* (2013.01); *H04W 80/04* (2013.01)

(58) Field of Classification Search
CPC ...... H04W 80/04; H04W 40/02; H04L 69/16; H04L 69/161
USPC ......................................... 709/219, 230, 231
See application file for complete search history.

(56) References Cited

U.S. PATENT DOCUMENTS

| | | | |
|---|---|---|---|
| 6,973,057 B1* | 12/2005 | Forslow | 370/328 |
| 7,263,087 B2* | 8/2007 | Soininen et al. | 370/338 |
| 7,698,463 B2* | 4/2010 | Ogier et al. | 709/242 |
| 7,933,268 B1* | 4/2011 | Melman | H04L 12/18 370/245 |
| 8,223,631 B2* | 7/2012 | Yasrebi et al. | 370/221 |
| 8,284,682 B2* | 10/2012 | Huq et al. | 370/250 |
| 2003/0081582 A1* | 5/2003 | Jain et al. | 370/338 |
| 2003/0185177 A1* | 10/2003 | Chitrapu | H04L 12/5692 370/335 |
| 2003/0185178 A1* | 10/2003 | Chitrapu | H04L 12/5692 370/335 |
| 2003/0185187 A1* | 10/2003 | Chitrapu | H04L 12/5692 370/338 |
| 2003/0185188 A1* | 10/2003 | Chitrapu | H04L 12/5692 370/338 |
| 2003/0185189 A1* | 10/2003 | Chitrapu | H04L 12/5692 370/338 |
| 2003/0185190 A1* | 10/2003 | Chitrapu | H04L 12/5692 370/338 |
| 2003/0200307 A1* | 10/2003 | Raju | G06F 12/1483 709/224 |
| 2004/0110484 A1* | 6/2004 | Koshino | H04W 88/14 455/403 |
| 2006/0268900 A1* | 11/2006 | Larsson | H04Q 3/0025 370/401 |
| 2007/0002833 A1* | 1/2007 | Bajic | 370/352 |
| 2007/0022479 A1* | 1/2007 | Sikdar et al. | 726/22 |
| 2007/0041360 A1* | 2/2007 | Gallagher et al. | 370/352 |
| 2007/0067046 A1* | 3/2007 | Berg | 700/1 |
| 2007/0188298 A1* | 8/2007 | Tariq | H04L 63/164 340/5.8 |

(Continued)

*Primary Examiner* — Davoud Zand
(74) *Attorney, Agent, or Firm* — James M. Wu; JW Law Group

(57) ABSTRACT

A process capable of distributing data is configured to receive a stream of data formatted under a wireless data communication protocol such as Universal Mobile Telecommunications System ("UMTS") or Long Term Evolution ("LTE"). After identifying the portion of the IP data from the stream of data in accordance with a predefined IP data identifier, the process separates the IP data from the stream of data. Upon reformatting the IP data into one or more IP packets, the IP packet(s) bypasses at least a portion of circuit network and move directly to an Internet router.

20 Claims, 5 Drawing Sheets

(56) References Cited

U.S. PATENT DOCUMENTS

| | | | |
|---|---|---|---|
| 2007/0189254 A1* | 8/2007 | Tariq | H04W 12/08 370/338 |
| 2007/0191001 A1* | 8/2007 | Tariq | H04W 76/022 455/426.1 |
| 2008/0098129 A1* | 4/2008 | Niddam et al. | 709/247 |
| 2009/0325634 A1* | 12/2009 | Bienas et al. | 455/552.1 |

* cited by examiner

METHOD AND APPARATUS FOR BYPASSING INTERNET TRAFFIC

FIELD

The exemplary embodiment(s) of the present invention relates to communications network. More specifically, the exemplary embodiment(s) of the present invention relates to routing Internet Protocol ("IP") data having a header and a payload.

BACKGROUND

A high-speed network environment typically includes network devices such as routers and bridges for facilitating delivery of information packets and/or data traffic from source devices to destination devices. Information pertaining to the transfer of packet(s) through the network is usually embedded within the packet itself. Data packet and/or data frames traveling through one or more wireless and/or wired communications networks such as Internet and/or Ethernet can typically be handled independently from other packets in a data stream or traffic. For example, each router which may include routing and bridging engines processes incoming data traffic and determines where the packet(s) should be forwarded. In a high-speed computing network environment, the speed of packet processing, which includes routing, bridging, and/or both, can be critical in determining the overall performance of communications network.

With increasing popularity of wireless Internet access via handheld devices, the traditional radio frequency based wireless networks such as radio backhaul networks become obsolete since they were designed for traditional slower radio traffics. Conventional radio wireless networks, for example, are not equipped to handle voluminous data traffics. Also, currently employed wireless device(s) lacks the management capabilities such as network security, metering and other administrative tasks.

A problem associated with current available mobile devices is the lack of speed to access and/or process Internet data. For example, typical handheld devices, such as smart phones and personal digital assistants ("PDAs"), are equipped to process large volume of audio, video, and data information independently and/or simultaneously via wireless communications network. Large volume of data streaming between users' end and the Internet can slow down the overall processing speed of packet processing for radio backhaul networks.

SUMMARY

An apparatus and method for data communication between nodes and Internet using Internet Bypass are disclosed. A process capable of distributing data is configured to receive a stream of data formatted under a wireless data communication protocol wherein the stream of data includes Internet Protocol ("IP") data. The wireless data communication protocol, for instance, can be a data format of Universal Mobile Telecommunications System ("UMTS"), Long Term Evolution ("LTE"), or a combination of UMTS and LTE. After identifying the portion of the IP data from the stream of data in accordance with a predefined IP data identifier, the process separates the IP data from the stream of data. Upon reformatting the IP data into one or more IP packets, the IP packet(s) bypasses at least a portion of circuit network and travels directly to an Internet router.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
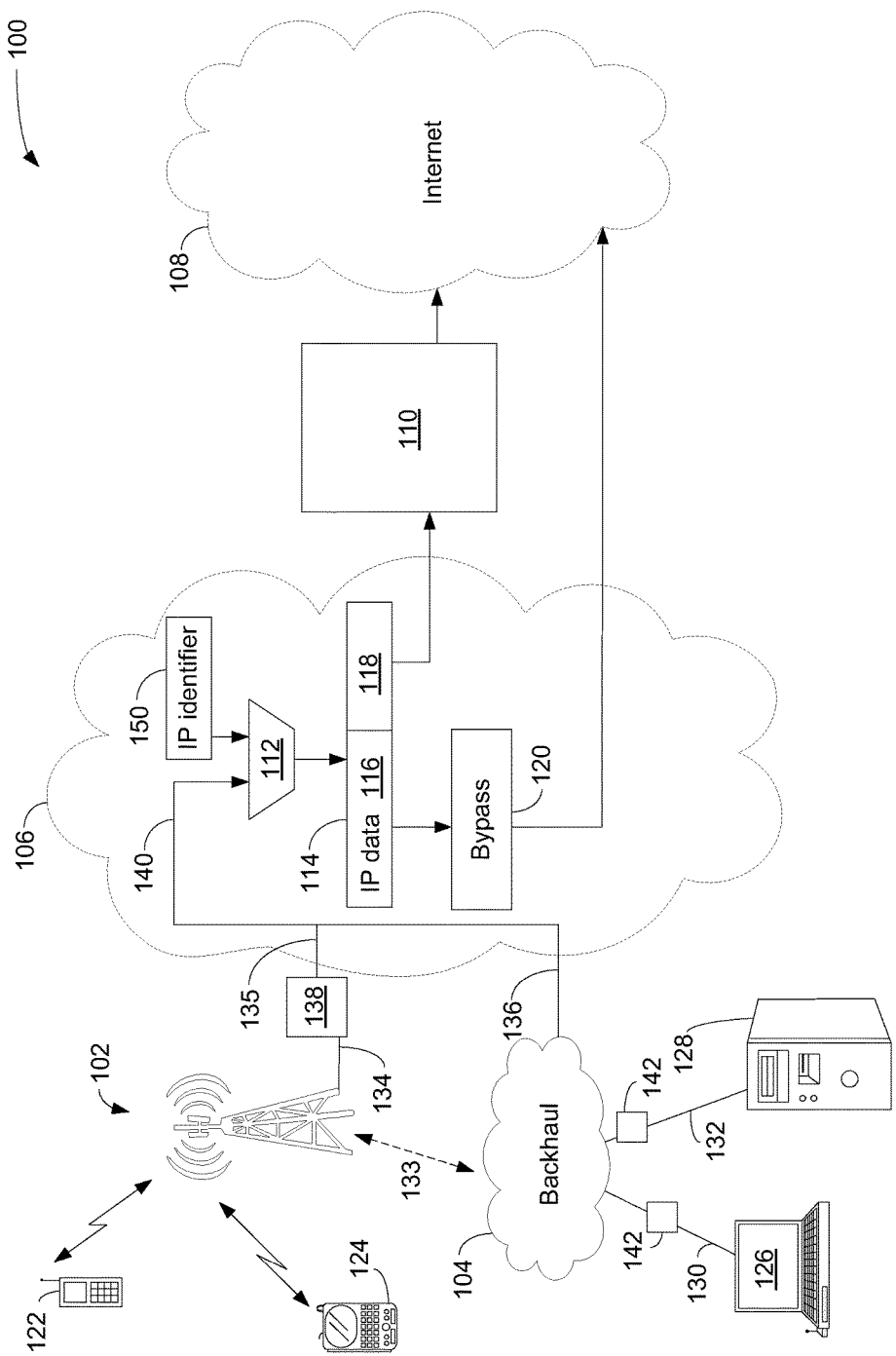
FIG. 1 is a block diagram illustrating a network system capable of improving network communication using IP data bypassing in accordance with one embodiment of the present invention.

Exemplary embodiment(s) of the present invention is described herein in the context of a method, device, and apparatus of implementing Internet Bypass to improve network communications.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items A process capable of enhancing data distribution is configured to receive a stream of data formatted under Universal Mobile Telecommunications System ("UMTS"), Long Term Evolution ("LTE"), or both. After identifying the portion of the IP data from the stream of data in accordance with a predefined IP data identifier, the process separates the IP data subject to bypass from the stream of data. Upon reformatting this IP data into one or more IP packets, the IP packet(s) bypasses at least a portion of circuit network and travels directly to an Internet router. It should be noted that the term "IP data" embodies data which may be formatted using TCP or UDP and an IP header.

FIG. 1 is a block diagram 100 illustrating a network system capable of improving network communication using IP data bypassing in accordance with one embodiment of the present invention. Diagram 100 includes a base station 102, a backhaul network 104, a bypassing logic 106, a circuit switching management 110, and Internet 108. The network system, in one aspect, may include other network systems such as mobile and/or wired (or wireline) operator network(s). It should be noted that the underlying concept of the exemplary embodiment(s) of the present invention would not change if one or more blocks (circuit) were added to or removed from diagram 100.

Base station 102 includes a radio tower and a base station controller 138, wherein the tower and base station controller 138 may be connected by a connection 134. Base station controller 138 is capable of communicating with mobile devices such as cellular phone 122 and a handheld device 124 via the radio tower and radio wireless connections. It should be noted that base station 102, not shown in FIG. 1, may include additional radio towers as well as other land switching circuitry. In one embodiment, base station controller 138, which could be considered as a node, is configured to compile with a wireless network standard, such as LTE and UMTS air interfaces, to communicate with end user(s). Note that base station 102, also known as Node B, may be connected to a Radio Network Controller ("RNC"). RNC is an air interface manager for one or more nodes such as Node Bs.

UMTS, in an aspect, can be a third-generation ("3G") cell phone technology used for various 3G cellular radio systems. UMTS can support a wireless radio communication having a rate of speed from 384 kbit/s to 14 Mbit/s data transfer rates. On the other hand, Long Term Evolution ("LTE"), also known as 3GPP LTE, is a next generation or forth-generation ("4G") cell phone technology, which is set to improve the UMTS mobile phone standard. LTE, for example, provides improved spectral efficiency, costs, and services. In addition, LTE is an air interface for a mobile network using Orthogonal Frequency-Division Multiple Access ("OFDMA") for downlink while using SC-FDMA (DFTS-FDMA) for uplink. It should be noted that OFDMA is able to facilitate simultaneous multiple data transmissions to handle multiple end users.

Backhaul network 104 provides and facilitates multiple communication links for various computer systems. For instance, computer 126 and server 128 can upload or download information to or from the Internet 108 via connections 130-132 and subnetworks 142, respectively. A function of backhaul network 104 is to provide intermediate links between a core network and subnetworks at the edge of the network. For example, cell phones communicating with a single cell tower or DSL subscribers connecting to a nearest Ethernet node can be considered as local subnetworks. The connection between the local subnetworks and the rest of the world is provided by backhaul networks such as backhaul network 104. Backhaul network 104 supports wireline (or wired) and/or wireless (or mobile) networks, such as base stations, ATM aggregation node, Ethernet aggregation node, and the like. It should be noted that base station 102 may also be connected to backhaul 104 as indicated by a dotted line 133 for connecting to the rest of the world.

Bypassing logic 106 is coupled to base station 102, backhaul network 104, circuit switching management 110, and Internet 108. In one embodiment, bypassing logic 106 can be a software implementation that resides at base station 102, backhaul network 104, circuit switching management 110, and/or other devices, not shown in FIG. 1. It should be noted that embedded software can be used and installed in switches and routers deployed in various wireless networks. Bypassing logic 106 includes an IP identifier 150, a comparison element 112, a data buffer 114, and a bypass circuit 120. IP identifier 150 is a database containing known IP application tags indicating IP data. For example, the tag "http:// or https://" of the Hyper Text Transfer Protocol ("HTTP") application of IP can be denoted that the data associated with addressing "http" is IP data or IP data frame that can be subject to bypass.

During an operation, when comparison element 112 receives a stream of data frame(s) or packets from a bus 140, wherein the data frames may come from base station 102 via bus 135 or backhaul 104 via bus 136. It should be noted that the terms "connection," "wire," and "bus" can be used interchangeably. Upon identifying IP data from a portion of the data frames, it is forwarded to an IP buffer 116, while the remaining portion of the data frames are forwarded to a local buffer 118. The data in local buffer 118 is subsequently forwarded to circuit switching management 110, and the IP data subject to bypass in IP buffer 116 is forwarded to bypass circuit 120. Bypass circuit 120 subsequently forwards the IP data directly to Internet 108 bypassing entire or a portion of circuit switching management 110.

Figure 2A:
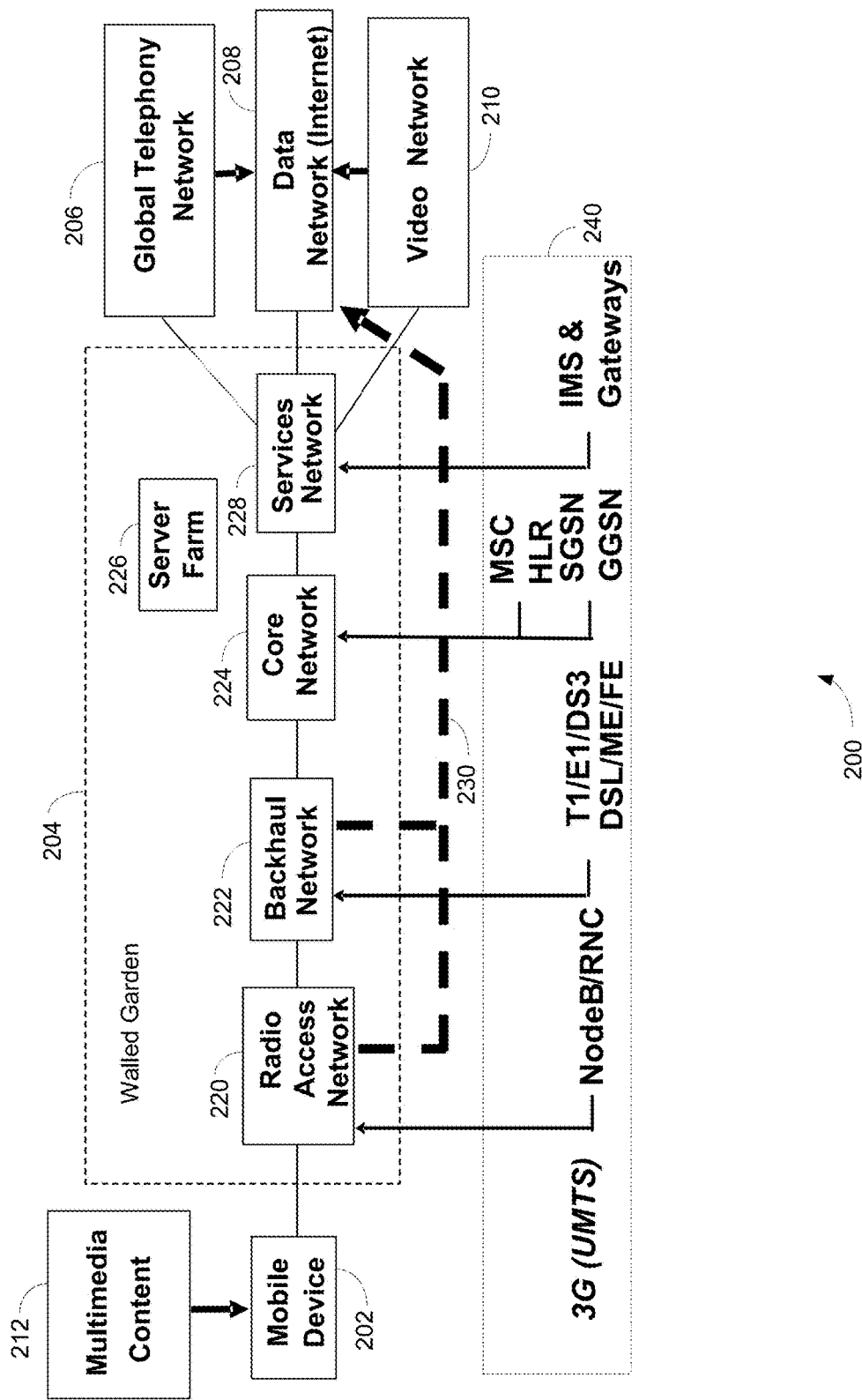
FIGS. 2(A-B) are block diagrams illustrating a circuit network having a function of bypassing in accordance with one embodiment of the present invention.
Figure 2B:
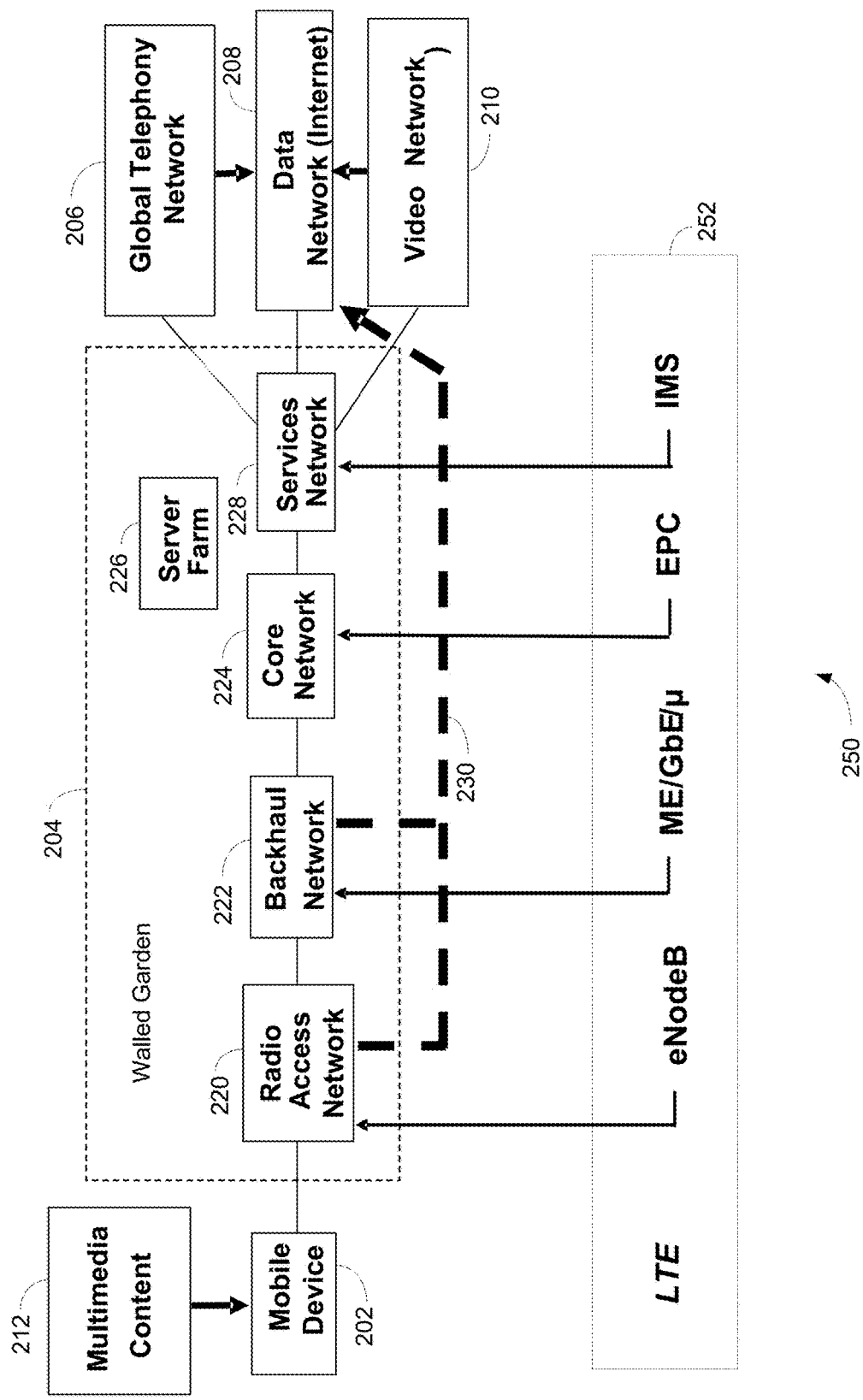

Circuit switching management 110 is a managed circuit network operated by an operator(s), which is also known as the "Walled Garden". A Walled Garden, for instance, is a closed set of information processing devices and services operated by service providers to a group of subscribed users. In one aspect, FIGS. 2A-2B depict the scope of a Walled Garden. Circuit switching management 110, in one embodiment, includes a server farm, a radio access network, a backhaul network, a core network, a services network, and the like. A function of circuit switching management 110 or Walled Garden is to provide and/or manage network links between users' end and the Internet.

An advantage of using the bypass logic is to improve bandwidth efficiency by providing an alternate path for high speed traffic in wireless radio networks. Embodiment(s) of the Internet Bypass is applicable to the Internet traffic portion of a total traffic. The Internet traffic portion or IP data, for example, is selected and subsequently sent onto a separate connection via a physical path directly to devices that are equipped to process the IP data. Another advantage of using the bypass logic is to save cost and reduce overall traffic latency by allowing network operators to separate traffic into multiple portions wherein each portion can be directly delivered to a device or devices for faster processing or routing.

FIG. 2A is a block diagram 200 illustrating a circuit network having a bypassing function for IP data in accordance with one embodiment of the present invention. Diagram 200 includes a mobile device 202, a circuit network 204, a global telephony network 206, a data network 208, and a video network 210. While global telephony network 206 can be a Public Switched Telephone Network ("PSTN"), video network 210 provides and/or distributes display content such as a TV program. Data network 208 can be a world wide communications network such as a wide area network ("WAN"), Internet, Global area network ("GAN") and the like. It should be noted that the underlying concept of the exemplary embodiment(s) of the present invention would not change if one or more blocks (circuit) were added to or removed from diagram 200.

Circuit network or Walled Garden 204 is used to facilitate an end-to-end provisioning as well as service management, and may be owned by a network provider for supporting mobile communications. Circuit network 204 includes a server farm 226, a radio access network ("RAN") 220, a backhaul network 222, a core network 224, and a service network 228. Depending on the applications, circuit network 204 could be configured to implement air interface standards for UMTS, LTE, or both. Note that the underlying concept of circuit network 204 would not change if one or more blocks (circuit) were added to or removed from block 204.

RAN 220 is part of a wireless and/or mobile communication system wherein RAN is used to provide communication between User Equipments ("UEs") and core network 224. The UEs can be various mobile and/or cellular handheld devices such as cellular phones, terminal equipments, mobile stations, and so forth. RAN 220, which is also known as node B, is managed or controlled by a radio network controller ("RNC"). Under UMTS 3G radio access technology, RAN 220 is capable of supporting a data rate having a capacity from 30 megabit per second ("Mbps") to 300 Mbps. Note that a moving handset or cellular phone is capable of connecting simultaneously to multiple RANs for seamless handover between different RANs without disruption in service.

Backhaul network 222, in one embodiment, transmits data from a remote location to a central location wherein the remote location could be a cell site or a base station. Various intermediate links between core network 224 and subnetworks are provided by backhaul network 222. The subnetworks, also known as subnet, may be a node or nodes situated at the edge of a network. For example, backhaul network 222 can support various network connections and hierarchical structured nodes such as Ethernet aggregation nodes, Metro Ethernet ("ME"), and the like. Various types of technologies, standards, and protocols may be employed by backhaul network 222. For example, network technologies such as microwave radio relay transmission, Ethernet, Fast Ethernet ("FE"), Digital Subscriber Line ("DSL") data transmission, Plesiochronous Digital Hierarch ("PDH"), and/or Synchronous Digital Hierarch ("SDH") can be used by backhaul network 222. PDH and SDH support T1, E1, and DS3. While T1 is a data circuit having a line rate of 1.5 Mbps with 24 user channels, E1, on the other hand, is a data circuit having a line rate of 2 Mbps with 32 user channels. DS3 is also known as T3 carrier, which has a line rate of 44 Mbps with 670 channels. Various technologies can be calibrated or set by a network operator(s).

Core network 224, in one embodiment, includes Mobile Switching Center ("MSC"), Home Location Register ("HLR"), Serving GPRS Support Node ("SGSN"), and Gateway GPRS Support Node ("GGSN") wherein GPRS stands for General Packet Radio Service. While HLR is used for storing subscriber information, MSC carries out the switching functions. Core network 224, which may also be referred to as GPRS Core Network, is a network controlling unit capable of providing mobility management, session management and/or data packet transmission. For example, core network 224 employs GPRS Tunneling Protocol ("GTP") to facilitate and maintain each moving connection from place to place. GTP, for instance, transmits subscriber's data from a current SGSN to the next SGSN via a GGSN for keeping the subscriber's session connected.

Service network 228 includes an IP Multimedia Subsystem (IMS) and/or IMS gateway for delivering IP related information. IMS, in one embodiment, facilitates access of multimedia and/or voice applications from wireless devices to wired (or wireline) terminals. Service network 228 is coupled to global telephone network 206, Internet 208, and video network 210.

Server Farm 226 includes a cluster of computers or servers used to increase computing power far beyond the capability of one computer or server. Server farm 226 includes a network of servers including primary servers and backup servers wherein a backup server takes over functions of a primary server in the event that the primary server fails. Various network switches and routers within Walled Garden 204 are supported by server farm 226.

In an operation, when a mobile device 202 receives a stream of data from multimedia system 212, the stream of data is forwarded to circuit network 204 or Walled Garden for data processing. The stream of data, which may be generated by multimedia system 212, includes multiple portions of information, such as IP data, traffic control, voice traffic, and the likes. Note that the IP data may include web traffic and unidentifiable IP addresses and they can be candidates for Internet Bypass or IP data bypass. Upon reaching a bypass logic or circuitry, IP data portion of the stream of data is identified and separated, whereby IP data is repackaged or reformatted as one or more IP packets. Depending on the source of the stream of data, the IP packet(s) will bypass core network 224 and services network 228 and directly travel to Data network or Internet 208 via bypassing channel 230. Bypassing channel 230, in one embodiment, is a data path capable of transport IP data directly from a circuit-switching network node to a packet-switching network node without passing through some unnecessary circuit-switching based devices. It should be noted that if the stream of data is received by RAN 220, the IP packets will also bypass at least a portion of backhaul network 222 as shown in FIG. 2A. Bypass logic 106, as shown in FIG. 1, is capable of routing the IP data or IP information directly to the Internet. It should be noted that the process of bypassing can be accomplished by a simple switching mechanism.

An advantage of using Internet Bypass is to split or separate the stream of data into a "common Internet traffic" portion (such as, for example, traffic representing established, well known applications) and a targeted portion wherein the targeted portion is processed through Walled Garden 204 while the common Internet traffic portion is forwarded directly to the Internet. Another advantage of using the Internet Bypass is to allow parts of the stream of data to reach the wireline network more quickly. In addition, after extracting the IP data portion from the data stream, less traffic flows through Walled Garden 204 whereby Internet Bypass enhances Walled Garden's processing capacity with respect to the incoming data stream. As such, operators owning edge routers will have sufficient resources to provide Deep Pocket Inspection ("DPI"), metering, and security features as may be mandatory for their network operation.

FIG. 2B is a block diagram 250 illustrating a circuit network having a function of bypassing in accordance with one embodiment of the present invention. Diagram 250 is capable of performing similar functions as diagram 200 except that Walled Garden 204 in diagram 250 is configured to support communications network with LTE air interfaces. Like diagram 200 shown in FIG. 2A, diagram 250 includes a mobile device 202, a circuit network 204, a global telephony network 206, a data network 208, a video network 210, and multimedia content system 212 wherein multimedia system 212 may contain user generated content. It should be noted that the underlying concept of the exemplary embodiment(s) of the present invention would not change if one or more blocks (circuit) were added to or removed from diagram 250.

Under LTE air interface, RAN 220 includes one or more eNodeBs, which can be considered as base station plus some management functions. An eNodeB, for example, may integrate functions traditionally performed by RNC with RAN wherein eNodeB is capable of supporting a data rate of 100 Mbps to 1000 Mbps. Backhaul network 222, in one embodiment, is configured to handle information to and from various types of transmission protocols, such as Metro Ethernet ("ME"), Gigabit Ethernet ("GbE"), and/or microwave information transmissions. Core network 224 may be designed to include System Architecture Evolution ("SAE") having Evolved Packet Core ("EPC"). Note that EPC is capable of providing packet radio services.

Figure 3:
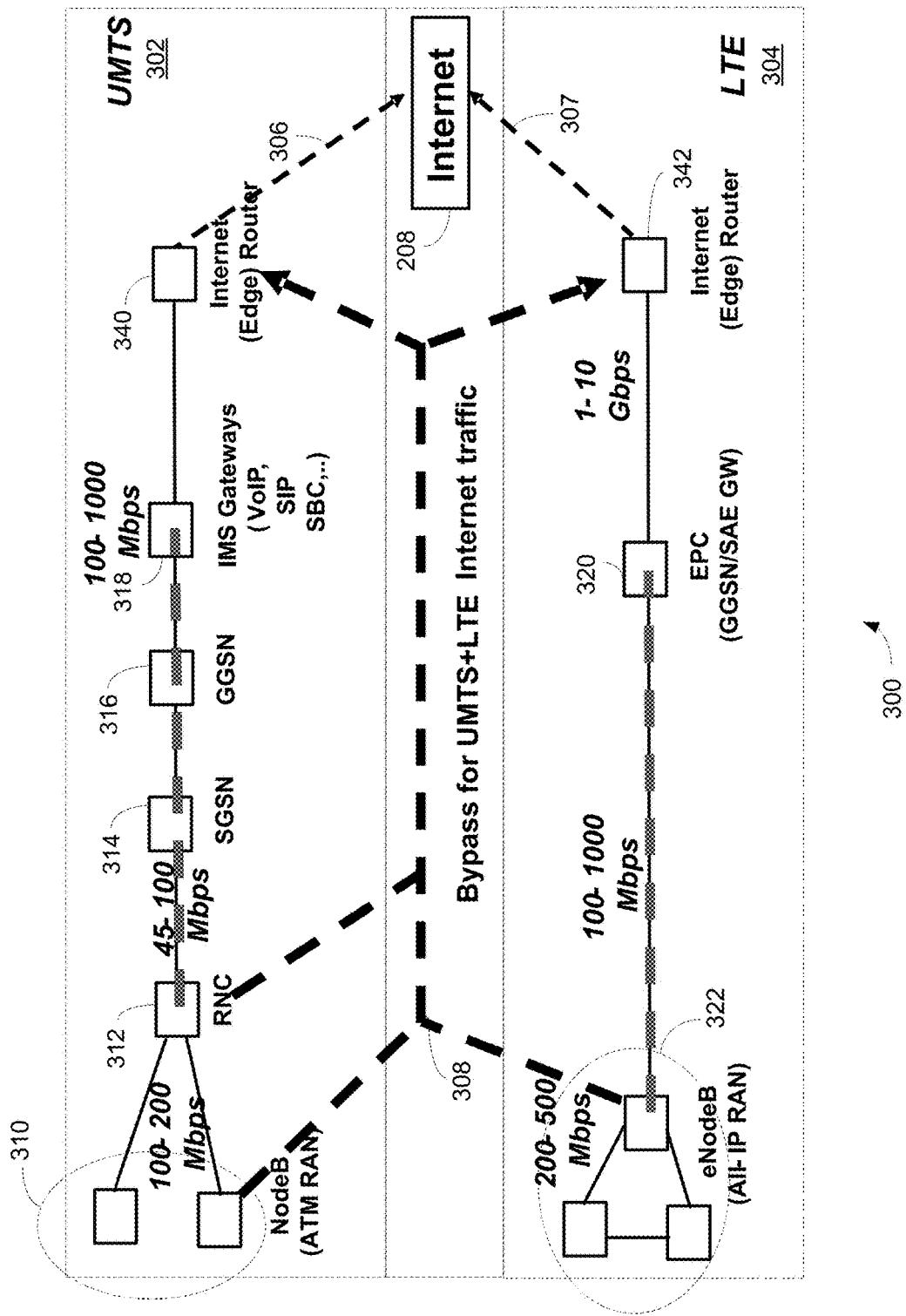
FIG. 3 is a diagram illustrating an Internet Bypass in accordance with one embodiment of the present invention.

FIG. 3 is a diagram 300 illustrating an Internet Bypass in accordance with one embodiment of the present invention. Diagram 300 includes a UMTS block 302, an LTE block 304, and a bypass channel 308. UMTS block 302 is configured to distribute information organized and formatted under UMTS air interface standard, and is capable of delivering Internet Bypass by forwarding IP data directly to Internet 208 via bypass channel 308. LTE block 304, on the other hand, is configured to distribute information organized and formatted under LTE air interface standard, and is also capable of performing Internet Bypassing scheme for bypassing IP data. It should be noted that the underlying concept of the exemplary embodiment(s) of the present invention would not change if one or more blocks (circuit) were added to or removed from diagram 300.

UMTS block 302 includes NodeBs 310, an RNC 312, an SGSN 314, a GGSN 316, an IMS gateway 318, and an Internet router 340. Internet router 340, for example, can be an edge router connecting and/or coupling to Internet 208 via connection 306. The data rate passing through UMTS block 302 for instance can be expected from 40 Mbps to 100 Mbps. Bypass logic or function can be implemented at NodeB 310. When IP data arrives at NodeB 310, the IP data bypasses at least a portion of routing elements such as SGSN and GGSN and travels directly from NodeB 310 to Internet 208 via bypass channel 308. Alternatively, the bypass logic and/or function may be implemented at other devices such as RNC 312. For example, if RNC 312 receives IP data, it is capable of directly forwarding the IP data to Internet 208 via bypass channel 308.

LTE block 304 includes eNodeBs 322, an EPC 320, and an Internet router 342. Internet router 342, for example, can be an edge router connecting to Internet 208 via a connection 307. The data rate passing through LTE block 304, in one embodiment, should be between 100 Mbps and 1000 Mbps. Bypass logic and/or function can be implemented at eNodeB 322 wherein eNodeB 322 is capable of directly forwarding IP data to Internet 208 via bypass channel 308. Upon receipt of the IP data, Internet router 342 routes the IP data directly or indirectly to the Internet via connection 307. Depending on the hardware layout and the capabilities of the system, Internet routers or edge routers 340-342 can be the same router and connections 306-307 can be the same connection.

As described earlier, a portion of the data stream can be bypassed. The following table illustrates exemplary scope of data stream that can be bypassed. It should be noted that a network operator(s) may be able to alter the scope of bypassing.

| Traffic Treatment | Subject to Bypass | Not Subject to Bypass |
|---|---|---|
| UMTS | Explicit web traffic, if identifiable Unidentified IP addresses | Control traffic Traffic Identified as "Internal" Voice traffic |
| LTE | All web traffic, based on unidentified web addresses | SIP and associated RTP Concurrent UMTS as identified |

During an operation, a data stream with UMTS arrives at node B 310. Upon separating common Internet traffic portion and the targeted traffic portion from the data stream, the IP packet(s) is subsequently forwarded to an edge router 340 via bypass channel 308 as appropriate. Edge router 340 may or may not reside in the Walled Garden. The targeted portion of the data stream such as control traffic and/or voice traffic is subsequently forwarded to RNC 312. After RNC 312, the targeted portion of the data stream travels through SGSN 314, GGSN 316, and IMS gateways 318 before it reaches to edge router 340. It should be noted that the targeted portion of the data stream contains fewer data packets or data frames than the original data stream, and thus UMTS 302 can process the data stream more quickly after the IP data is extracted.

During an operation under LTE, a data stream arrives at eNodeB 322. Upon separating an IP portion from the data stream, the IP portion is reformatted into one or more IP packets. The IP packet(s) is subsequently forwarded to an edge router 342 via bypass channel 308. Edge router 342 may or may not be resided in the Walled Garden. The targeted portion of the data stream such as control traffic and/or voice traffic is then forwarded to EPC 320 before it reaches to edge router 342. It should be noted that the targeted portion of the data stream contains less data packets or data frames than the data stream, and thus LTE 304 is able to process the data stream more quickly after removal of IP data.

An advantage of employing the LTE Internet Bypass is to avoid costly GSN upgrades as well as tunneling solutions at NodeB and adjacent switches. In addition, Internet Bypass can keep Internet traffic and treatment away from operator's private network and keep voice on TDM trunks without upgrading. Another advantage is to reduce overall network latency by skipping L2 processing and tunnel switching.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 4:
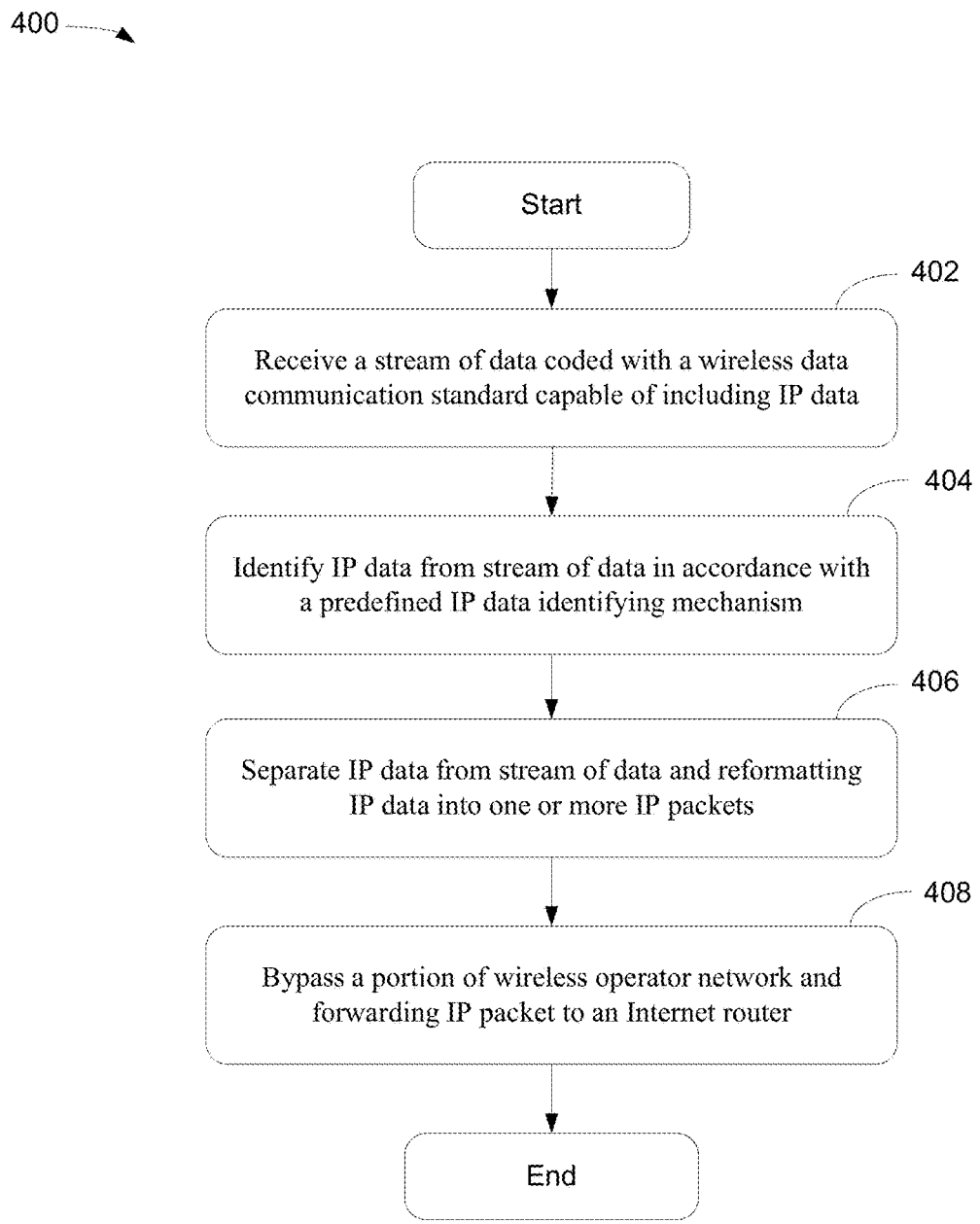
FIG. 4 is a flowchart illustrating an IP data bypassing process capable of performing Internet Bypass in accordance with one embodiment of the present invention.

FIG. 4 is a flowchart 400 illustrating an IP data bypassing process capable of performing Internet Bypass in accordance with one embodiment of the present invention. At block 402, a bypassing process receives a stream of data or data stream including the IP data coded in a wireless data communication protocol. In one embodiment, the process is capable of receiving data packets having a data format of LTE. The information from a base station, for example, can be obtained via LTE air interface. Alternatively, the process is also able to receive data packets having a data format of UMTS. In one example, the process can obtain information from a base station through UMTS air interface.

At block 404, the process is capable of identifying the IP data from the stream of data in accordance with a predefined IP data identifier. In one embodiment, the process is also able to create a list of IP indicator in accordance with identifiable web traffic.

At block 406, the process separates the IP data from the stream of data and reformats the IP data into one or more IP packets. Upon extracting the IP data from the stream of data to form an internal data stream, the process, in one embodiment, is capable of forwarding the internal data stream to the circuit network. The circuit network, for instance, can be at least a portion of a Walled Garden.

At block 408, the process bypasses a portion of circuit network and forwards the IP packet to an Internet router. For example, the process is capable of bypassing one of an Evolved Packet Core ("EPC") and an IP Multimedia System ("IMS") and directly forwards the IP packet to the Internet. In one embodiment, the process sends the IP packet directly to the Internet via an edge router.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for data distribution, comprising:
    receiving a stream of data coded with a wireless data communication protocol for routing;
    retrieving a set of predefined Internet Protocol ("IP") data identifiers from a local storage and identifying IP data coded in IP format including an IP address from the stream of data in accordance with at least one of the set of predefined IP data identifiers;
    splitting the stream of data into the IP data and a remaining portion of the stream of data, and reformatting the IP data into an IP data portion of the stream of data; and
    forwarding the IP data portion of the stream of data to Internet bypassing at least a portion of the core network while forwarding the remaining portion of stream of data to at least a portion of the core network.

2. The method of claim 1, wherein the extracting the IP data from the stream of data further includes:
    reformatting the remaining portion of the stream of data to form an internal data stream; and
    forwarding the internal data stream to Walled Garden for data processing via the core network.

3. The method of claim 1, wherein receiving a stream of data, coded with a wireless data communication protocol, includes receiving data packets having a data format of Long Term Evolution ("LTE").

4. The method of claim 3, wherein receiving data packets having a data format of LTE includes obtaining information from a base station.

5. The method of claim 1, wherein receiving a stream of data, coded with a wireless data communication protocol, includes receiving data packets having a data format of Universal Mobile Telecommunication System ("UMTS").

6. The method of claim 5, wherein receiving data packets having a data format of UMTS further includes obtaining information from a base station.

7. The method of claim 1, wherein identifying the IP data from the stream of data in accordance with a predefined IP data identifier includes creating a list of IP indicators in accordance with identifiable web traffic.

8. The method of claim 1, wherein forwarding the IP data portion of the stream of data includes bypassing one of an Evolved Packet Core ("EPC") and an IP Multimedia System ("IMS").

9. The method of claim 8, wherein forwarding the IP data portion of the stream of data includes sending the IP packet to Internet via an edge router.

10. A method for data distribution, comprising:
    obtaining a stream of data frames coded with a wireless network protocol capable of including Internet Protocol ("IP") data coded with Transmission Control Protocol and the Internet Protocol ("TCP/IP") transmitted via a mobile network;
    retrieving an IP tag list from a local storage and identifying the IP data from the stream of data frames in accordance with the IP tag list;
    splitting the stream of data frames into an IP data portion and a remaining portion of the stream of data frame, and reformatting the IP data portion of the steam of data frames; and
    forwarding the IP data portion of the stream of data frames to Internet bypassing a portion of a core network while facilitating the remaining portion of the stream of data frames to continue traveling to the core network.

11. The method of claim 10, wherein extracting the IP data from stream of data frames further includes:
    reformatting the remaining portion of the steam of data frames to form an internal data stream; and
    forwarding the internal data stream to the backhaul network.

12. The method of claim 10, wherein obtaining a stream of data frames coded with a network protocol includes receiving data packets having a data format of Long Term Evolution ("LTE").

13. The method of claim 12, wherein receiving data packets having a data format of LTE includes obtaining the data packets from one of a Metro Ethernet data distribution network, a Gigabit Ethernet Switch data distribution network, and a microwave data distribution network.

14. The method of claim 10, wherein obtaining a stream of data frame coded with a network protocol includes receiving data packets having a data format of Universal Mobile Telecommunication System ("UMTS").

15. The method of claim 14, wherein receiving data packets having a data format of UMTS further includes obtaining the data packets from one of a T1 network, an E1 network, a DSL network, and a Fast Ethernet network.

16. A network system, comprising:
a router operable to route Internet Protocol ("IP") data coded in IP format including at least a portion of IP address to Internet;
a bypassing channel coupled to the router and able to facilitate forwarding IP data to Internet bypassing a core network via the router;
a radio access network ("RAN") coupled to the bypassing channel and configured to receive a stream of data coded with a wireless data communication protocol from a mobile device, wherein the RAN includes a bypassing logic operable to split the stream of data into two portions wherein a portion is an IP data portion of the stream of data and another portion is an remaining portion of the stream of data, wherein the remaining portion of the stream of data is forwarded to a core network, wherein the IP data portion of the stream of data is routed to Internet through the router bypassing the core network via the bypassing channel.

17. The system of claim 16, wherein the bypassing logic further includes:
a comparison element capable of extracting the IP data from the stream of data to form an internal data stream; and
a local buffer coupled to the comparison element and configured to forward the internal data stream to the core network.

18. The system of claim 17, wherein the core network includes a backhaul network, a core network, and a services network for providing functions including network security, network metering and network administrating.

19. The apparatus of claim 16, wherein the RAN coupled to the bypassing channel and configured to receive a stream of data coded with a wireless data communication protocol from a mobile device includes identifying data packets having a data format of Long Term Evolution ("LTE").

20. The apparatus of claim 16, wherein the RAN coupled to the bypassing channel and configured to receive a stream of data coded with a wireless data communication protocol from a mobile device includes identifying data packets having a data format of Universal Mobile Telecommunication System ("UMTS").

* * * * *